May 6, 1958  R. B. COLT  2,833,498
PARACHUTE RELEASE DEVICE
Filed June 2, 1955  5 Sheets-Sheet 1

INVENTOR
Rutger B. Colt.
BY
K. G. Doub
ATTORNEY

May 6, 1958 R. B. COLT 2,833,498
PARACHUTE RELEASE DEVICE
Filed June 2, 1955 5 Sheets-Sheet 2

INVENTOR
Rutger B. Colt.
BY
ATTORNEY

May 6, 1958 R. B. COLT 2,833,498
PARACHUTE RELEASE DEVICE
Filed June 2, 1955 5 Sheets-Sheet 3

INVENTOR
Rutger B. Colt.
BY K. G. Doub
ATTORNEY

May 6, 1958 R. B. COLT 2,833,498
PARACHUTE RELEASE DEVICE
Filed June 2, 1955 5 Sheets-Sheet 5

INVENTOR
*Rutger B. Colt.*
BY *K. G. Doub.*
ATTORNEY

United States Patent Office 2,833,498
Patented May 6, 1958

2,833,498

PARACHUTE RELEASE DEVICE

Rutger B. Colt, Baltimore, Md., assignor to Bendix Aviation Corporation, Baltimore, Md., a corporation of Delaware Application June 2, 1955, Serial No. 512,775

13 Claims. (Cl. 244—150)

This invention relates to improvements in parachute release devices of that type utilizing a wound spring for exerting a pull on the ripcord of a packaged chute after a preset time delay following withdrawal of an arming pin or the like, provided the chutist is at a predetermined altitude. The time delay may be and usually is provided by an escapement mechanism connected through a train of gears with a spring-powered pulley or drum on which the pull cable is wound, and the altitude release by an aneroid-controlled latch arrangement which when unlatched releases the escapement mechanism, subject to withdrawal of the arming pin. The timing mechanism is preset to ensure clearance by the chute of the aircraft from which the chutist may be jumping irrespective of altitude once the arming pin has been withdrawn, while the altitude release or control is preset to release the latch mechanism at a predetermined altitude irrespective of at what higher altitude the arming pin may have been withdrawn.

Naturally, as a safety factor, it is imperative that the force exerted on the ripcord be well above that required to release the packaged chute, and one of the difficulties heretofore encountered has been the inability to provide a power spring and associated control mechanism which would exert the required pulling force on the relatively short length of pull cable without the necessity of interposed gear reduction mechanism and which at the same time would meet specifications as to over-all size and weight, and the primary object of the present invention is to provide a parachute release device which will fulfill these qualifications.

Another object is to provide a parachute release device in which the power spring exerts a direct pull on the pull cable in a manner such that the cable is subjected to the maximum force of the spring over a relatively short range of pull, while at the same time the device as a whole may be made compact and easy to time and adjust.

Still another object is to provide a parachute release device incorporating a power spring and associated latch and release mechanism arranged in a manner such that the spring may be prewound to a predetermined degree, for example when the unit is assembled at the factory, and will remain in such prewound condition, it being only necessary thereafter to complete the winding of the spring over the range of its power stroke when the device is conditioned for use with a parachute.

A further object is to provide a parachute release device of the type specified in which the power spring acts directly on the pull cable drum or pulley without involving intermediate transmission mechanism and which at the same time is rugged and dependable and will always be ready for use irrespective of how long it may have been stored.

The foregoing and other objects and advantages will become apparent in view of the following description taken in conjunction with the drawings, wherein.

In the following description, reference will be had to the assembled views of Figs. 3, 4 and 5 in conjunction with the schematic of Figs. 1 and 2. However, the essential parts of the device are shown in Figs. 1 and 2, the remaining figures illustrating the unit in one of its production forms.

Figure 3:
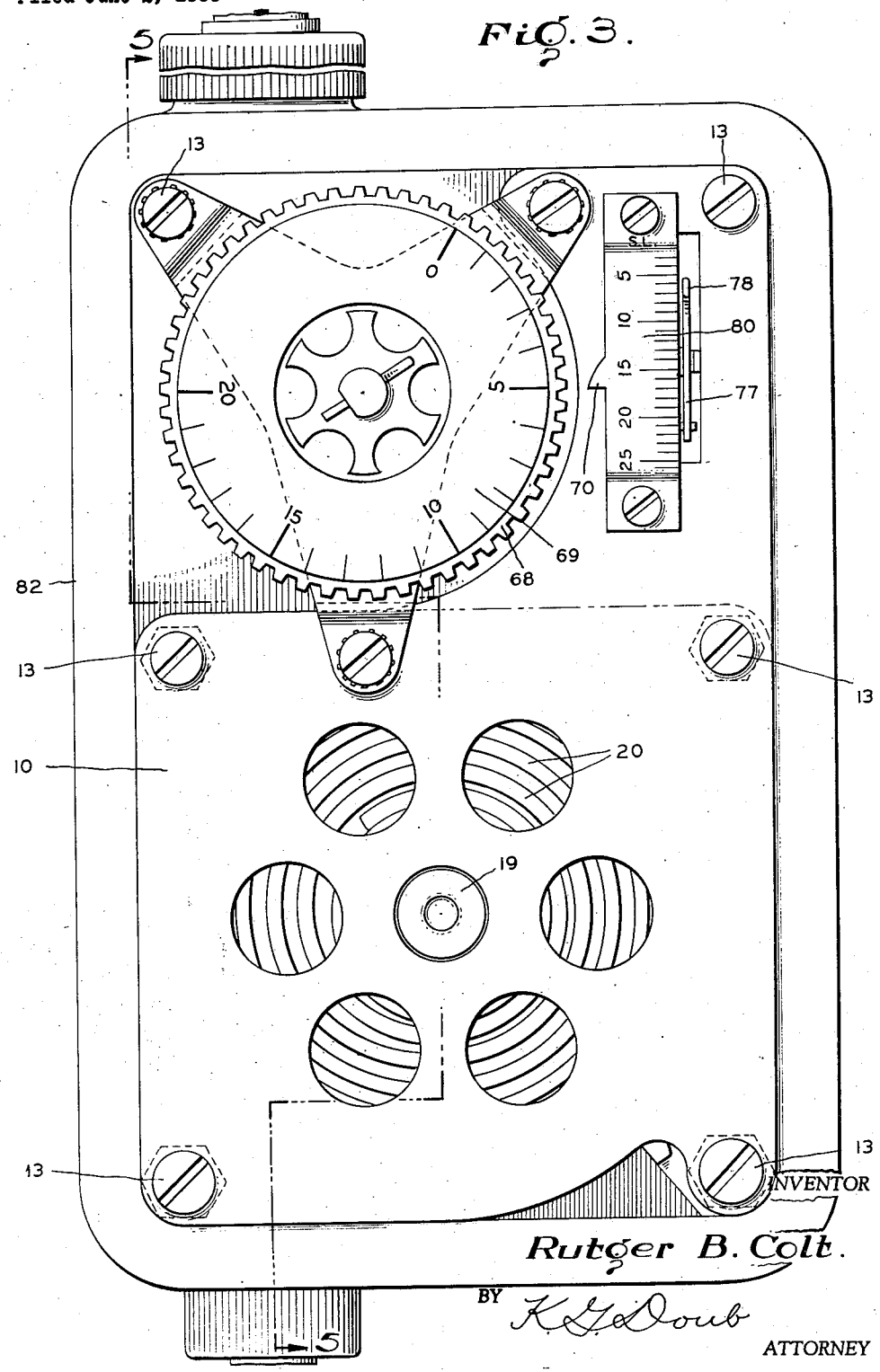
Fig. 3 is a plan view of the ripcord release device of Figs. 1 and 2 as it appears when assembled in its case with the cover of the latter removed.
Figure 4:
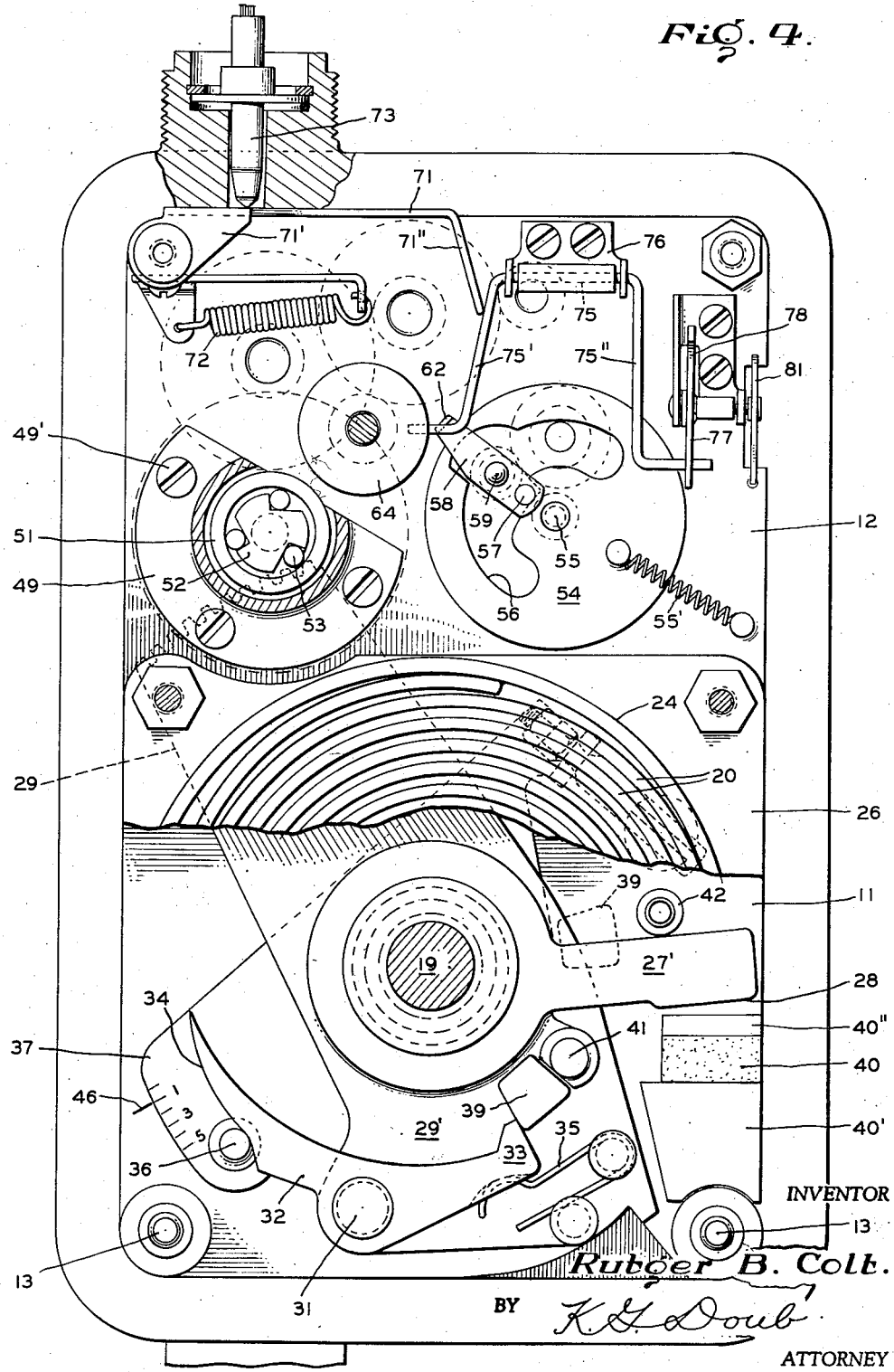
Fig. 4 is a view similar to Fig. 3 but with parts broken away and in section and the altitude setting dial removed.
Figure 5:
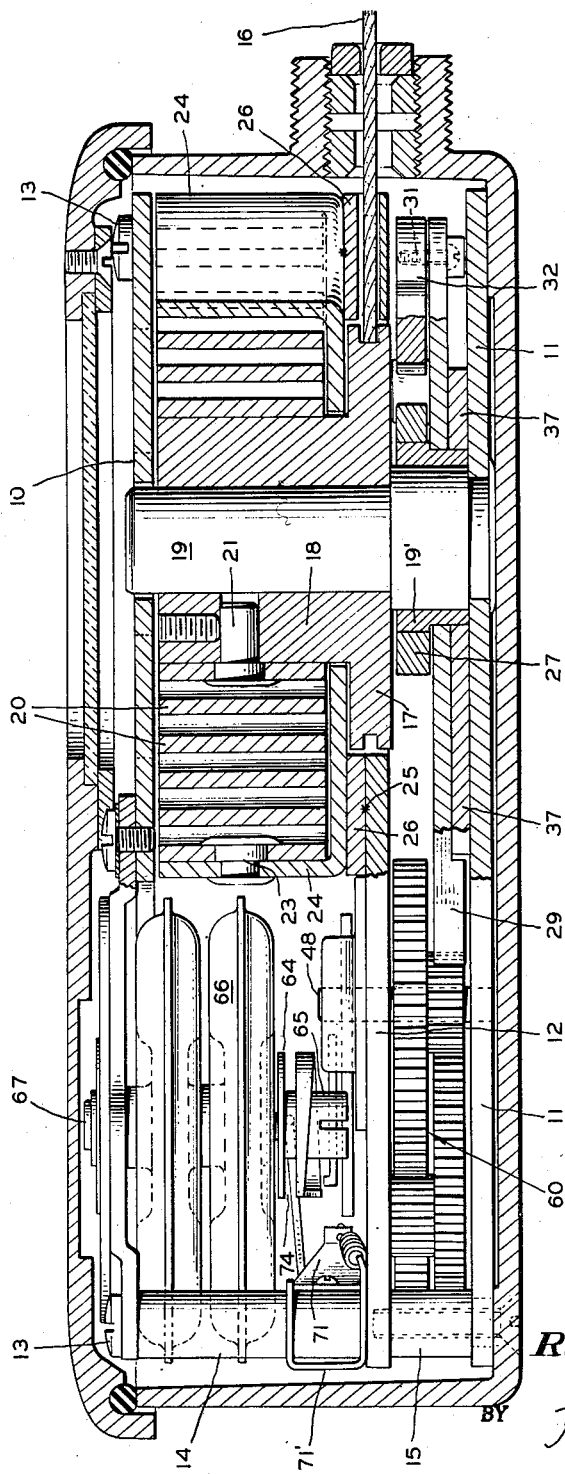
Fig. 5 is a longitudinal section taken substantially on the line 5—5, Fig. 3, with the cover applied.

The main supporting frame for the various parts comprises top and bottom plates 10 and 11 and an intermediate plate 12, the said plates being connected in spaced relation by screw studs or posts 13, see Figs. 3, 4 and 5, which project through spacers or separators 14 and 15.

Figure 1:
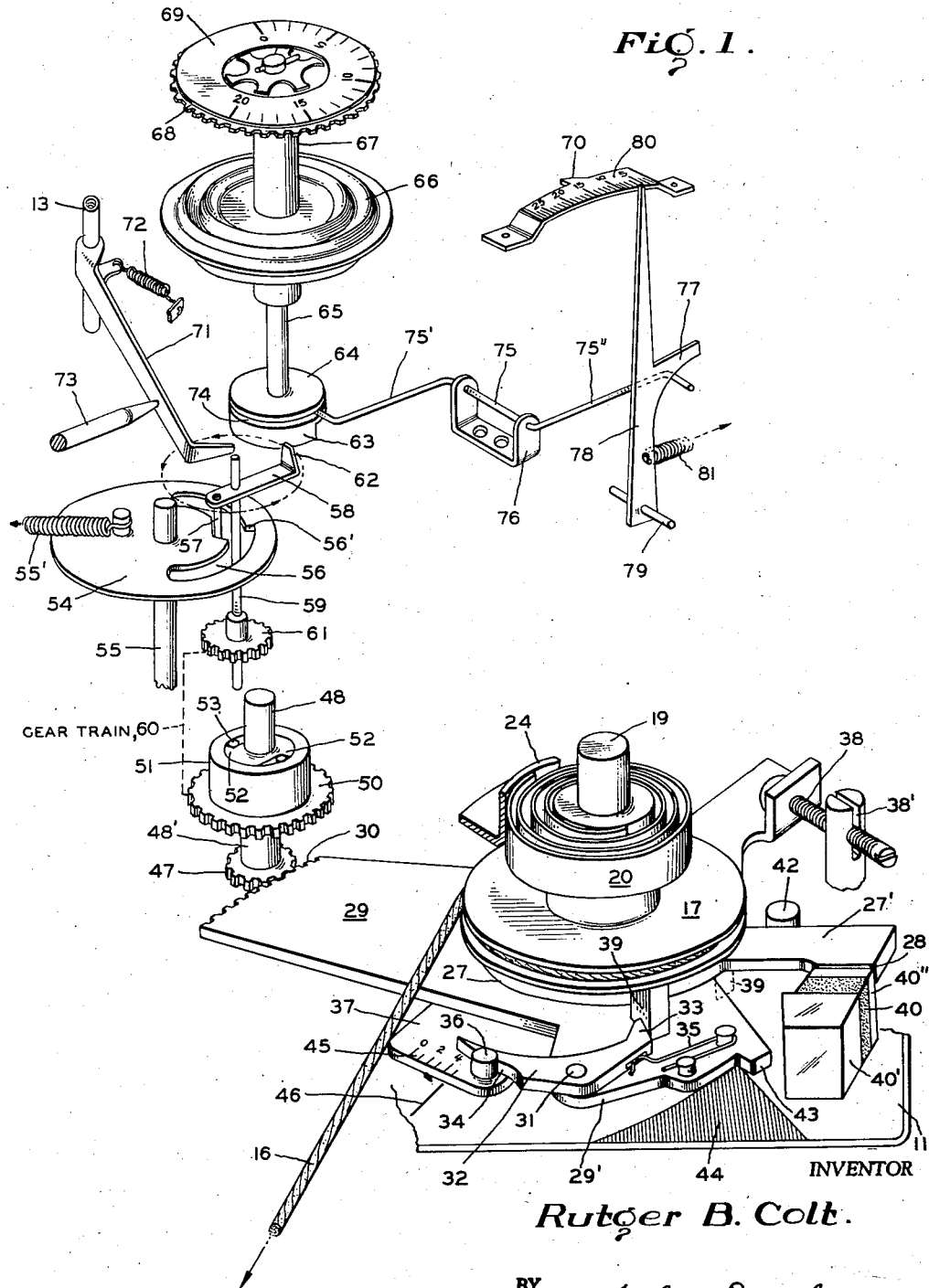
Fig. 1 is a schematic view of a parachute release device in accordance with the invention.
Figure 2:
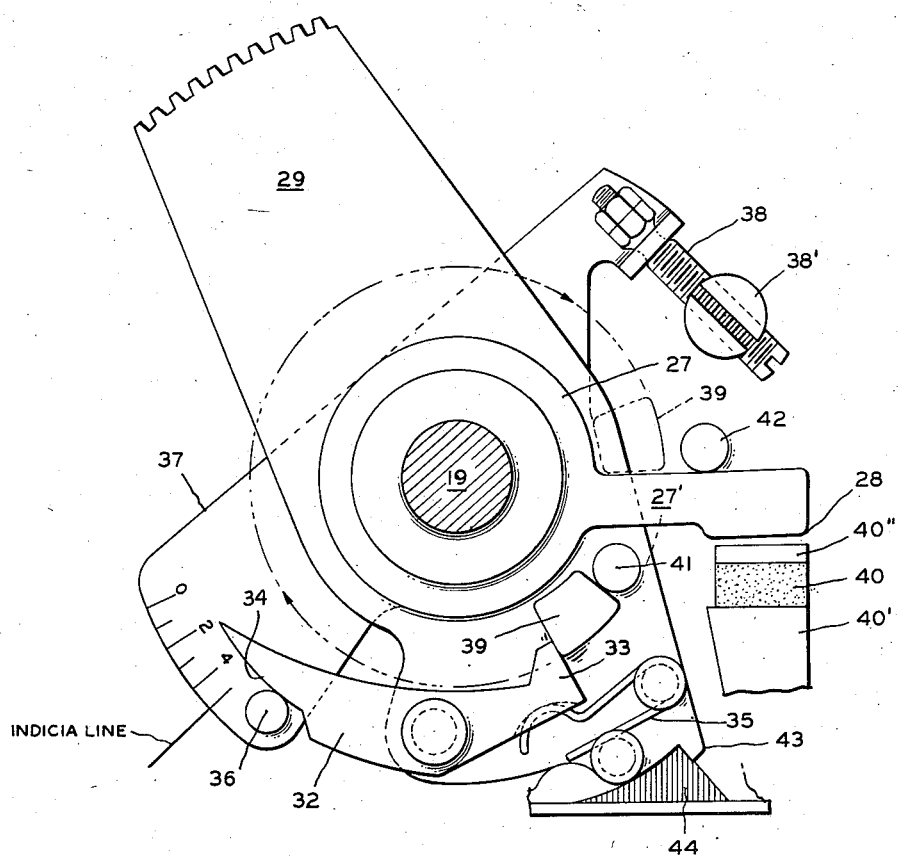
Fig. 2 is a plan view of the ripcord operating or pull mechanism.

A ripcord operating cable is shown at 16; it is adapted to be connected at one end to the parachute ripcord, not shown, and at its opposite extremity the said cable is connected to, and wound upon a cable drum 17, formed integrally with a hub 18, the latter being rotatably mounted on a stub shaft or stud 19, which at its opposite ends is anchored to the upper and lower plates 10 and 11, compare Figs. 1 and 5. A power spring 20 has its inner end affixed to the hub 18, at 21, and at its outer end is secured at 23 to a cup-shaped housing member 24, which receives the spring and has a base portion anchored as by welding at 25 to a plate 26, the latter in turn overlying the intermediate plate 12 and being clamped against the adjacent surface of the latter by four of the screw studs 13 and spacers 14. The cable drum 17 is received in an opening formed in the center plates 12 and 26; and a contact ring or annulus 27, the function of which will be subsequently described, is rotatably mounted on a bushing 19' secured on an enlarged portion of the stub shaft or stud 19 and has a radially-projecting arm 27', terminating in a contact head 28, compare Figs. 1, 2 and 5.

A sector gear 29 is rotatably mounted on the enlarged portion of the stub shaft 19; it is of elongated form and at its outer end is provided with a series of teeth 30, for a purpose to be explained. Projecting radially outwardly from the body portion of the sector gear 29 is an integral ratchet or pawl-mounting portion 29', having a pivot pin 31 projecting upwardly or outwardly therefrom, on which is mounted a pawl 32, having a tooth 33 formed on one end thereof and a cam 34 on its opposite end or extremity, note Figs. 1 and 2. A light wire spring 35 is anchored to the pawl-mounting portion 29' of the sector gear 29 and has a spring arm bearing against the adjacent outer edge of the pawl 32 so as to normally urge the latter inwardly or in a counter-clockwise direction as viewed in Figs. 1 and 2. The cam 34 is adapted to engage a ratchet trip member in the form of a cam follower or wiper 36, carried by one of the arms of an elongated timer plate 37, having an intermediate collar portion rotatably mounted on a reduced portion of the bushing 19', the other arm of the timer plate 37 being connected to an adjusting screw 38, which is threaded through a stud 38' rotatably anchored or swiveled on the plates 11 and 12. This adjustment provides a convenient timing means for the parachute release device, since the location of the cam wiper 36 determines the point during rotation of the sector gear 29 in a counter-clockwise direction at which the toothed end 33 of the pawl 32 is moved clear of a boss 39, formed integral with and projecting downwardly or outwardly from the adjacent surface of the cable drum 17, to thereby release the cable drum and permit the full torque force of the power spring 20 to be exerted thereon in a direction tending to wind the cable 16 on said drum, as will be more fully set forth in the description of operation. In Fig. 2, the full line position of the boss 39 shows its location when the spring 20 has been wound to preset the parachute release device, while the dotted line position of said boss shows its location following a complete power stroke of the device, during which the cable drum has been rotated through approximately 300°. When the spring 20 has rotated the cable drum 17 to the ripcord-release position, the contact end 28 of the arm 27' engages and compresses a resilient shock-absorber and stop 40, which is secured on the adjacent face of a boss 40', anchored to the base plate 11, said stop 40 being made of cushioning or shock-absorbing material, preferably synthetic rubber such as neoprene, protected by a metal bumper plate 40".

When the cable drum 17 has been rotated in a counter-clockwise direction to wind the spring 20, it is necessary that the sector gear 29 be also rotated in a similar direction but to a less extent to return it to a given preset position with respect to the timing mechanism, to be described; and to obtain this operation, a boss 41 is projected upwardly or outwardly from the rear body portion of said gear and is so located that when the cable drum approaches its fully wound position, the boss 39 engages the said boss 41, whereupon the drum and sector gear rotate in unison to move said gear to a predetermined or preset position. Figs. 2 and 4 illustrate the position of the sector gear when the spring is in wound position, the boss 39 having previously contacted the boss 41 as the drum 17 approaches its wound position, causing the drum and sector gear to rotate together as the winding operation is completed. Another boss 42, projecting from the lower or outer frame plate 11, functions as a reverse stop for the arm 27', which is positively moved to its reverse position against the stop 42 through engagement of the boss 41 with said arm near the end of the winding turn of the cable drum 17. This latter operation could also be obtained by providing a stop 40 having sufficient compression and expansion properties as to push the arm 27' back against the stop 42 when the boss 39 is moved clear of said arm at the start of the winding operation.

To provide a visual indication for an observer or inspector as to when the critical operating parts of the parachute device above described have been preset with the spring 20 fully wound, a pointer 43 projects radially outwardly from the pawl-mounting portion 29' of the sector gear 29 and coacts with suitable indicia 44, painted or otherwise delineated on the aforesaid surface of the plate 11.

To provide a timing calibrator for the parachute release device as a whole, the one end of the timing plate 37 which carries the trip cam wiper pin or follower 36 is provided with a series of graduations, as at 45, adapted to coact with a fixed calibration mark 46, delineated on the adjacent surface of the plate 11. Since the angular location of the pin or cam follower 36 determines the point at which the pawl 32 will be tripped when the sector gear 29 is permitted to rotate due to release of the escapement mechanism in a manner to be described, the location of the timing plate 37 (conveniently adjustable by screw 38) determines the time which will elapse between release of the escapement and tripping or release of the cable drum to effect its power stroke.

While any suitable timing and altitude control mechanism may be utilized, that herein shown is preferred due to the manner in which it coacts with the ripcord release mechanism heretofore described. Proceeding with a description of the escapement mechanism, the toothed portion 30 of the sector gear 29 is in constant mesh with a pinion gear 47, which is fixed on the enlarged end 48' of a short clutch shaft 48, the latter at its lower end having bearing in the plate 11 and at its upper end projecting into a clutch housing 49, secured to the middle plate 12 by screws 49', compare Figs. 1 and 4. A gear 50 and a clutch drum 51 are mounted for free rotation as a unit on shaft 48, said drum having therein clutch cams 52 and coacting rollers 53 arranged in a manner such as to clutch the drum to the shaft when the latter is rotated in a counter-clockwise direction and free the shaft from the drum when said shaft is rotated in a clockwise direction, which occurs when the cable drum is rotated in a counter-clockwise direction to wind the power spring 20.

An oscillating disc 54 is fixed on the one extremity of a shaft 55, which is supported for rotation by the plates 11 and 12, the said disc being resiliently urged to a centered or null position by means of a spring 55', anchored at its one end to the periphery of the disc and at its opposite end to the intermediate plate 12. An arcuate cam slot 56 is formed in the disc 54 and is provided with cam surfaces 56', adapted to engage a cam pin 57, projecting from the one arm of an escapement latch 58, secured on the one end of a freely rotatable shaft 59, which projects through the plates 12 and 11 and has bearing therein. A train of escapement gears 60 connect the gear 50 with a gear 61, secured on the shaft 59, the train of gears 60 being mounted on a series of short pins or stub shafts located between the plates 11 and 12 and having bearing at their opposite ends in the latter. At its free end, the latch 58 is provided with a latch member 62, adapted to coact with the outer surface of a cam 63, formed on an annular disc-like member 64, secured on the lower end of a shaft 65, the opposite end of which is connected to the movable end wall or diaphragm of a pressure-responsive capsule 66 (shown as a stack of capsules in Fig. 5). The opposite or upper movable end wall or diaphragm of the capsule 66 is connected to one end of a shaft 67, which projects into an opening formed in the frame plate 10 and is provided with a toothed or knurled finger disc 68 having a calibrated scale surface 69 coacting with a pointer 70, projecting from a calibrated scale member 80, to be described. Rotation of the finger disc 68 effects rotation of the entire unit (shaft 67, capsule 66 and shaft 65) and hence determines the angular position of the cam 63, the outer surface of which presents a barrier to the latch member 62 should the latter attempt to turn in a counter-clockwise direction. Since the effective position of said cam, at a given angular setting, is governed by the expansion and contraction of the pressure-responsive capsule 66, its location is a function of altitude, and angular adjustment thereof by means of the finger disc 68 will determine the altitude at which the cam 63 clears the latch member 62 and permits the escapement latch 58 to oscillate.

A manually releasable latch in the form of a bar 71 projects from a bracket 71', which is pivotally mounted on the adjacent corner post 13, the free end of the bar terminating in an inturned stop arm 71". A spring 72 normally urges the latch bar 71 outwardly or in a counter-clockwise direction. When the latch bar is pushed inwardly by a suitable device such as an arming pin 73, its free end, or the arm 71", lies in the path of oscillation of the latch member 62. However, when the arming pin is withdrawn, the bar 71 moves back to a position which brings the arm 71" clear of the path of oscillation of said latch member, whereupon the escapement disc 54 will start to oscillate in response to the driving torque exerted by the sector gear 29 on the gear 61 through the train of gears 60, providing the altitude cam 63 is at that time free of the latch member 62.

To provide a visual means for indicating possible leaks in the capsule 66, the altitude cam 63 is provided with an annular groove 74 in which the one end of a crank arm 75' engages, said arm forming part of a crank 75, which has bearing in a bracket 76, anchored to the intermediate or middle plate 12, the other arm 75" of the crank terminating in a follower, adapted to engage the surface of a cam 77, carried by a pointer arm 78, pivotally supported at one end, as at 79, and at its opposite end coacting with the calibrated scale 80, compare Figs. 1, 3 and 4. A spring 81 normally urges the arm 78 in a clockwise direction to its zero position. Since the capsule 66 is evacuated, should it spring a leak it will expand abnormally, with the result that the pointer end of the arm 78 will move counter-clockwise along the scale 80, to thereby indicate leakage and the degree of the latter.

Figure 6:
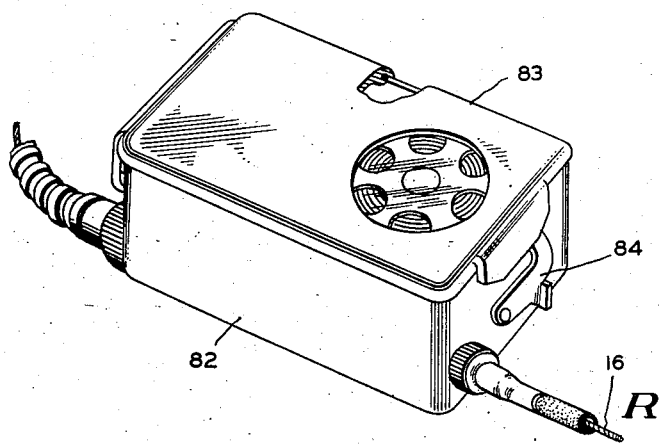
Fig. 6 is a perspective view of the release device as it appears when assembled in its case.

Fig. 6 shows the release mechanism mounted in a case 82 provided with a cover 83 held in place by a latch 84.

Operation

The power spring 20 may be fully wound when the unit is assembled at the factory, or it may be prewound to the point where the power stroke terminates. In either case, the power spring cannot run down when it delivers its power stroke; it simply unwinds from a fully wound condition to a partly wound condition. After the device leaves the factory, or after it has been used by a chutist, the only winding necessary is through one turn or less of the cable drum 17.

To preset the release device, the finger disc 68 is adjusted for the desired altitude, and the screw 38 may also be adjusted to obtain the desired timing period, viz., the time which elapses between release of the escapement mechanism and release of the cable drum by the pawl 32 to permit the power spring 20 to exert its pulling force on the ripcord. To wind the spring 20 from its prewound to a fully wound condition, mechanical leverage or power means may be required. In practice, a winding tool utilizing a winding drum, rotatable by a hand crank, has been employed successfully, but any other suitable means may be used. In the partly unwound position of the parts (termination of the power stroke) the sector gear 29 will have been rotated clockwise, bringing the toothed end 30 thereof to the right of the position shown in Fig. 1, and the boss 39 will have been rotated with the cable drum 17 through approximately 300° to its dotted line position. The diameter of the drum 17 is preferably such as to necessitate less than one complete revolution to obtain the required pull on the ripcord. Since the power spring makes a complete stroke within its maximum power range, or between a fully wound and a slightly unwound condition, the diameter of the drum may be made large enough to obtain the required pull within one revolution without necessitating an unduly heavy spring. When the cable 16 is pulled outwardly, the cable drum 17 is rotated counter-clockwise, the boss 39 being carried around with the drum from its dotted line position to the full line position shown in Fig. 2, at which time the pawl 32, or the toothed end 33 thereof, is urged radially inwardly and engages the boss 39, thereby blocking clockwise movement of the drum. During winding, as the drum approaches its fully wound position, the boss 39 engages the boss 41 on the sector gear 29 and moves the latter in a counter-clockwise direction back to the starting point of its timing stroke, or to the position shown in Fig. 1, the clutch assembly 51—53 permitting reverse rotation of gear 47 independently of gear 50 and hence the escapement mechanism. To cock the device, the arming pin 73 is inserted in the opening provided therefor and moves the latch bar 71 inwardly into the path of oscillation of the latch member 62, as heretofore described. The device is now ready for use.

When the device is used by a chutist, the arming pin may be withdrawn, either manually or by automatic means; and when the pin is withdrawn, the latch bar 71 moves clear of the latch member 62. If now the chutist is below the preset altitude, the effective surface of the cam 63 will clear the latch member 62. Since the sector gear 29 is now locked to the drum 17 and the spring 20 is constantly exerting torque on said drum in a clockwise direction, when the escapement disc 54 is unlatched and free to oscillate, the escapement mechanism will be driven by the said sector gear acting through the gear train 60. After a predetermined lapse of time, the sector gear 29 will have rotated in a clockwise direction to a point where the cam surface 34 of the pawl 32 engages trip boss or pin 36, whereupon the toothed end 33 of the pawl is moved clear of the boss 39, and the full force of the power spring 20 is applied through the arm 17 directly on the ripcord pull cable 16. Upon completion of the power stroke, the arm 27' will have contacted the bumper stop 40, which cushions or absorbs the shock of the stroke. The boss 39 has now been moved to the dotted line position shown in Fig. 2.

From the foregoing it will be seen that the power spring 20 acts directly on the cable drum and the latter in turn acts directly on the pull cord or cable without any intermediate transmission gearing or other mechanism susceptible of being stuck or blocked due to corrosion, infiltration of foreign matter, gumming or other reasons resulting from long-time storage. Furthermore, the power spring acts at the peak of its force, and a spring which is compact and occupies a minimum of space may be used and still have ample power to more than meet specifications.

While only one specific structural design of a device embodying the features of the invention has been illustrated and described, it will be obvious to those skilled in the art that certain changes and modifications in the details of construction may be made without departing from the spirit and scope of the invention as defined by the appended claims.

What is claimed and desired to be secured by United States Letters Patent is:

1. In a parachute release device, a rotatable cable drum, a ripcord pull cable connected to the drum, a power spring operatively connected to the drum to exert a driving torque thereon, timing means including a member rotatable with and relatively to the drum, coacting latch means carried by said drum and said member and arranged to latch the drum to said member when the drum has been rotated through a predetermined arc and in a direction to wind the spring, said timing mechanism including escapement means which when released is started in motion by the torque exerted on said member by said spring, and means for automatically tripping said latch means to permit the drum to rotate free of said member and be caused to deliver a power stroke following rotation of the member through a predetermined arc during a preset time-delay period.

2. In a parachute release device, a rotatable drum, a ripcord pull cable having a length thereof connected to and wound on the drum, a power spring operatively connected to the drum to apply a driving torque thereto, the diameter of the drum being such as to effect a ripcord-pull stroke within less than one complete revolution of the drum, timing means including a gear member rotatable with and relatively to said drum, coacting latch mechanism carried by said gear member and drum and arranged to latch the drum to said gear member following rotation of the drum through a predetermined arc in a direction to wind the spring, said timing mechanism including escapement means which when released is started in motion by the torque exerted on said gear member by said spring, cam means coacting with said latch mechanism and located to unlatch the drum from said gear member following rotation of the member through a predetermined arc during a preset time-delay period, and means for stopping rotation of said drum within one complete revolution of the latter in delivering a power stroke.

3. In a parachute release device, a rotatable drum, a ripcord pull cable having a length thereof connected to and wound on the drum, a power spring operatively condiameter of the drum being such as to effect a ripcord-pull stroke within less than one complete revolution of the drum, timing means including a gear member rotatable with and relatively to said drum, coacting pawl and ratchet mechanism carried by said gear member and said drum and arranged to latch the drum to said gear member following rotation of the drum through a predetermined arc in a direction to wind the spring, said timing mechanism including escapement means connected through a train of gears with said gear member and which when released is started in motion by the torque exerted on said gear member by said spring, means located within the path of rotation of said gear member for tripping said pawl and ratchet mechanism to permit said drum to rotate free of the gear member and deliver a power stroke following rotation of the gear member through a predetermined arc in a direction to wind said cable on the drum during a pre-set time-delay period, and means for stopping rotation of said drum within a complete revolution of the latter upon completion of a power stroke.

4. In a parachute release device, a rotatable cable drum, a power spring operatively connected to the drum to apply a driving torque thereto, a ripcord pull cable connected to the drum and having a predetermined length thereof wound on the drum when the spring is in a partly unwound condition, timing means including a sector gear rotatable with and relatively to said drum, coacting pawl and ratchet mechanism carried by said gear and drum and arranged to latch the drum to said gear following rotation of the drum through a predetermined arc in a direction to wind the spring, said spring being wound from a partly to a substantially fully wound condition within one complete revolution of the drum, said timing mechanism including escapement means connected through a train of gears with said sector gear and which escapement means is started in motion by the torque exerted on said gear by said spring, trip means located in the path of rotation of said pawl and ratchet mechanism to unlatch the drum from said gear and permit said drum to rotate free of the gear in delivering a power stroke following rotation of the gear through a predetermined arc during a preset time-delay period, and means for stopping rotation of said drum within less than a complete revolution of the latter upon completion of a power stroke.

5. In a parachute release device, a rotatable drum, a power spring operatively connected to the drum to apply a driving torque thereto, a ripcord pull cable connected to the drum and having a portion of its length wound thereon, said drum being of a diameter such as to effect a ripcord-pull stroke within less than one complete revolution of the drum, timing means including a gear member mounted to rotate with and also relatively to said drum, coacting latch mechanism carried by said drum and gear member and arranged to latch the drum to said gear member and thereby hold the drum against rotation in a cable-winding direction following rotation of the drum through a predetermined arc in a direction to wind the spring, escapement mechanism connected to said gear member, means for holding said escapement mechanism against operation, means for releasing said escapement mechanism, said escapement mechanism when released being started in operation by the torque exerted on said gear member by said spring whereupon said gear member and cable drum rotate in unison in a cable-winding direction, a cam member arranged to release said latch means and free the drum from the gear member to permit the drum to produce a power stroke following unison rotation through a predetermined arc during a preset time-delay period, and means for stopping rotation of said drum within one complete revolution of the latter to terminate the power stroke.

6. A parachute release device as claimed in claim 5 wherein said latch mechanism comprises a member projecting from said drum and a pawl pivotally mounted on said gear member and arranged to engage said projecting member upon completion of the winding operation, said pawl being tripped or released from engagement with said projecting member by said cam member.

7. A parachute release device as claimed in claim 5 wherein said means for stopping rotation of said drum to terminate the power stroke comprises an arm adapted to be engaged by a boss projecting from said drum as the latter approaches the end of its power stroke, a stop being located for engagement by said arm at the end of the power stroke.

8. A parachute release device as claimed in claim 5 wherein the cam member which acts to release said latch means is adjustable to vary the time-delay period.

9. A parachute release device as claimed in claim 5 wherein the cam member which acts to release said latch means is carried by a calibrated member, and means are provided for adjusting the arcuate position of said calibrated member to vary the time-delay period.

10. A parachute release device as claimed in claim 5 wherein said stop means comprises an arm mounted to rotate with the drum during at least part of the power stroke of the latter, said arm engaging a cushioned stop located within the path of rotation of said arm at the termination of the power stroke.

11. A parachute release device as claimed in claim 5 wherein said stop means comprises an annular member mounted for free rotation with respect to said drum and gear member and having a radially-projecting arm adapted to be engaged by a stop projecting from said drum, another stop being located for engagement by said arm within one complete rotation of said drum to determine the end of the power stroke of the latter.

12. In a parachute release device, a supporting framework, a rotatable cable drum having a peripheral cable-receiving portion and an axially projecting hub member, a ripcord pull cable connected to the peripheral portion of said drum, a power spring coiled around said hub member and having its inner end anchored to the latter and its outer end anchored to said framework, timing means including a gear member having a hub portion pivotally supported in axial alignment with said drum, coacting latch mechanism carried by said gear member and said drum and arranged in a manner such that when the spring is in a substantially fully wound condition the drum is latched to said gear member for rotation in unison therewith, escapement means connected to said gear member and which when released is caused to operate due to the torque exerted by said spring on said gear member through said drum, means arranged to release said latch means and free the drum from the gear member to permit the spring-actuated drum to produce a power stroke following rotation in unison of said drum and gear member through a predetermined arc during a preset time-delay period, and coacting stop means carried by said drum and adjacent framework for stopping rotation of said drum to terminate the power stroke.

13. In a parachute release device, a rotatable cable drum, a ripcord pull cable having a length thereof connected to and wound on the periphery of said drum, a power spring operatively connected to the drum to apply a driving torque thereto, timing means including a member having a peripheral portion in the form of a segmental gear and a body portion pivotally supported in substantial axial alignment with said drum, coacting latch mechanism carried by said member and drum and arranged to latch the drum to said gear member following rotation of the drum through a predetermined arc in a direction to wind the spring, said timing means including escapement mechanism operatively geared to said segmental gear and which escapement mechanism when released is started in motion by the torque exerted on said member by said spring, cam means coacting with said latch mechanism and located to unlatch the drum from said member following rotation of the latter through a predetermined arc during a preset time delay period, means for stopping rotation of said drum within one complete revolution of the latter in delivering a power stroke, and means for adjusting the location of said cam means to adjust the time delay period.

References Cited in the file of this patent

UNITED STATES PATENTS

| | | |
|---|---|---|
| 1,842,723 | Lafayette | Jan. 26, 1932 |
| 2,525,607 | Kuntz | Oct. 10, 1950 |
| 2,584,164 | Stallan | Feb. 5, 1952 |